(12) United States Patent
Piper

(10) Patent No.: US 7,649,854 B2
(45) Date of Patent: Jan. 19, 2010

(54) SYSTEM AND METHOD FOR PROVIDING CHANNELS IN APPLICATION SERVERS AND TRANSACTION-BASED SYSTEMS

(75) Inventor: Andrew Piper, Pleasanton, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 661 days.

(21) Appl. No.: 11/130,252

(22) Filed: May 16, 2005

(65) Prior Publication Data

US 2006/0015600 A1  Jan. 19, 2006

Related U.S. Application Data

(60) Provisional application No. 60/572,646, filed on May 19, 2004.

(51) Int. Cl.
*H04L 12/16* (2006.01)
*G06F 15/173* (2006.01)

(52) U.S. Cl. .............. 370/265; 370/252; 370/329; 370/395.32; 370/401; 370/428; 709/203; 709/223; 709/226; 709/245

(58) Field of Classification Search .............. 370/236, 370/252, 389, 395.32, 401, 428, 265, 329; 709/203, 223–245
See application file for complete search history.

(56) References Cited

U.S. PATENT DOCUMENTS

| | | | | |
|---|---|---|---|---|
| 6,067,545 A * | 5/2000 | Wolff | ............ | 707/10 |
| 6,098,093 A * | 8/2000 | Bayeh et al. | ............ | 709/203 |
| 6,101,508 A * | 8/2000 | Wolff | ............ | 709/223 |
| 6,381,644 B2 * | 4/2002 | Munguia et al. | ............ | 709/225 |
| 6,470,386 B1 * | 10/2002 | Combar et al. | ............ | 709/224 |
| 6,515,968 B1 * | 2/2003 | Combar et al. | ............ | 370/252 |
| 6,611,498 B1 * | 8/2003 | Baker et al. | ............ | 370/252 |
| 6,735,205 B1 * | 5/2004 | Mankude et al. | ............ | 370/395.32 |
| 6,859,839 B1 * | 2/2005 | Zahorjan et al. | ............ | 709/231 |
| 6,868,442 B1 * | 3/2005 | Burdeau | ............ | 709/223 |
| 6,886,035 B2 * | 4/2005 | Wolff | ............ | 709/219 |
| 6,957,199 B1 * | 10/2005 | Fisher | ............ | 705/78 |
| 6,990,513 B2 * | 1/2006 | Belfiore et al. | ............ | 709/203 |
| 6,996,631 B1 * | 2/2006 | Aiken et al. | ............ | 709/242 |
| 7,099,915 B1 * | 8/2006 | Tenereillo et al. | ............ | 709/203 |
| 7,114,083 B2 * | 9/2006 | Devine et al. | ............ | 713/152 |
| 7,272,613 B2 * | 9/2007 | Sim et al. | ............ | 707/102 |
| 7,590,746 B2 * | 9/2009 | Slater et al. | ............ | 709/229 |
| 7,603,454 B2 * | 10/2009 | Piper | ............ | 709/223 |
| 2002/0038371 A1 * | 3/2002 | Spacey | ............ | 709/227 |
| 2002/0059054 A1 * | 5/2002 | Bade et al. | ............ | 703/20 |
| 2002/0124089 A1 * | 9/2002 | Aiken et al. | ............ | 709/227 |
| 2003/0046396 A1 * | 3/2003 | Richter et al. | ............ | 709/226 |
| 2003/0191970 A1 * | 10/2003 | Devine et al. | ............ | 713/201 |
| 2003/0217129 A1 * | 11/2003 | Knittel et al. | ............ | 709/223 |
| 2003/0236745 A1 * | 12/2003 | Hartsell et al. | ............ | 705/40 |
| 2004/0010544 A1 * | 1/2004 | Slater et al. | ............ | 709/203 |
| 2004/0037299 A1 * | 2/2004 | Pandya | ............ | 370/401 |
| 2004/0078325 A1 * | 4/2004 | O'Connor | ............ | 705/39 |
| 2004/0088412 A1 * | 5/2004 | John et al. | ............ | 709/226 |
| 2004/0139001 A1 * | 7/2004 | Henriques et al. | ............ | 705/39 |
| 2004/0153508 A1 * | 8/2004 | Alcorn et al. | ............ | 709/205 |
| 2005/0262100 A1 * | 11/2005 | Piper | ............ | 707/10 |
| 2007/0294387 A1 * | 12/2007 | Martin | ............ | 709/224 |

* cited by examiner

*Primary Examiner*—Ayaz R Sheikh
*Assistant Examiner*—Venkatesh Haliyur
(74) *Attorney, Agent, or Firm*—Fliesler Meyer LLP

(57) ABSTRACT

A system and method for providing channels within application servers, messaging systems, and transaction-based systems. Network traffic internal to the server is carried over these channels. This allows the administrator to segregate internal network traffic, usually for security or performance reasons. In addition administrators have finer, dynamic, control over external network channels.

20 Claims, 3 Drawing Sheets

_US 7,649,854 B2_

SYSTEM AND METHOD FOR PROVIDING CHANNELS IN APPLICATION SERVERS AND TRANSACTION-BASED SYSTEMS

CLAIM OF PRIORITY

This application claims priority from provisional application entitled SYSTEM AND METHOD FOR PROVIDING CHANNELS IN APPLICATION SERVER AND TRANSACTION-BASED SYSTEMS, Application No. 60/572,646, filed May 19, 2004, by Andrew Piper, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to application servers, messaging systems, and transaction-based systems, and specifically to a system and method for providing channels in those systems.

BACKGROUND

In an application server environment, such as that provided in the WebLogic Server (WLS) product from BEA Systems, Inc., network channels, hereafter to referred to as "channels", are provided to allow external network traffic to be segregated as it arrives or leaves the server. Network channels allow a system administrator to configure additional ports with one or more WebLogic Server instances or clusters (ports in addition to the required Listen Port and SSL Listen Port). A network channel defines the basic attributes for a new network connection to WebLogic Server, including for example:

The protocols the connection supports (HTTP, HTTPS, T3, T3S, COM).

Default listen ports to use for secure and non-secure communication.

Default properties for the connection such as the login timeout value, maximum message sizes, and default user names and passwords.

Whether or not the connection supports tunneling.

Whether the connection can be used to communicate with other WebLogic Servers in the domain, or can be used only for communication with clients.

Channels are configured as distinct entities in the Administration Console, and then one or more channels can be added to servers within the domain. Using a single channel with multiple servers can simplify network configuration for a server domain, because changing the channel configuration automatically changes the connection attributes of all servers that use the channel. Using multiple channels with a single server helps the administrator to segment network traffic by protocol, listen ports, or any other channel configuration property. In a clustered environment, channels also provide the ability to configure clustered server instances on a single NIC, using different port numbers.

After configuring and assigning network channels, the administrator can optionally use channel overrides (also known as network access points) to fine-tune channel settings on an individual server. This includes support for all external protocols; support for connection through NAT firewalls, and support for custom administration channels. This deprecates the requirement for server-level overrides but does not deprecate the usability need for a domain-wide admin port. These channels can be marked exclusively for admin use and there may be more than one of them.

However, all of the above-described features are targeted at channeling external network traffic. Network traffic that is internal to the server is still generally carried over proprietary protocols. However, application server customers are increasingly demanding the ability to also segregate internal network traffic, usually for security or performance reasons. In addition, customers would like to be able to have finer, dynamic, control over external network channels. Accordingly, what is needed is a means for segregating this internal network traffic in a flexible and easily administered manner.

SUMMARY

In accordance with an embodiment of the invention, a system and method is provided for providing channels within application servers, messaging systems, and transaction-based systems. Network traffic internal to the server is carried over these channels. This allows the administrator to segregate internal network traffic, usually for security or performance reasons. In addition administrators have finer, dynamic, control over external network channels.

DETAILED DESCRIPTION

In accordance with an embodiment of the invention, a system and method is provided for providing channels within application servers, messaging systems, and transaction-based systems. Network traffic internal to the server is carried over these channels. This allows the administrator to segregate internal network traffic, usually for security or performance reasons. In addition administrators have finer, dynamic, control over external network channels.

Figure 1:
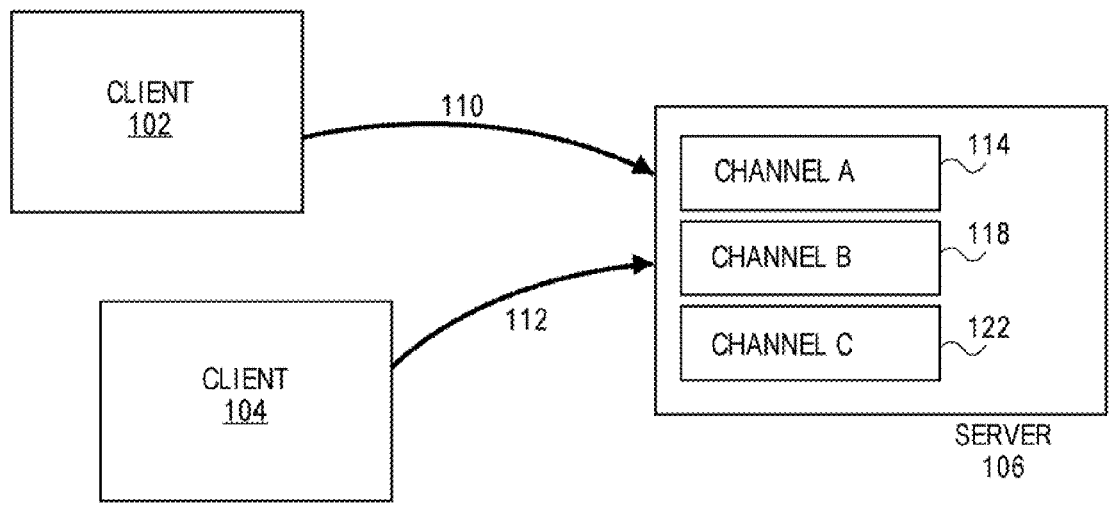
FIG. 1 shows an illustration of an client/server environment in accordance with an embodiment of the invention, that allows for dynamic channels.

FIG. 1 shows an illustration of an client/server environment in accordance with an embodiment of the invention, that allows for dynamic channels. As shown in FIG. 1, clients 102, 104 may access a remote server 106, in the form of requests or other communications 110, 112. The server includes a number of channels 114, 118, 122 which are configured to handle the requests. An administrator may use an administrative console program to configure the channels. In accordance with an embodiment, each of the channels are dynamic, and may be activated and deleted as necessary. The channels may also be configured to provide dynamic Secure Sockets Layer (SSL). Previously, any configuration to the channels required a restart of the server. Channels can be used to discriminate among certain types of requests and handle them appropriately. For example, different multiplexers (muxers) may be associated with different channels, for purposes of providing failover, or to optimize the system.

Figure 2:
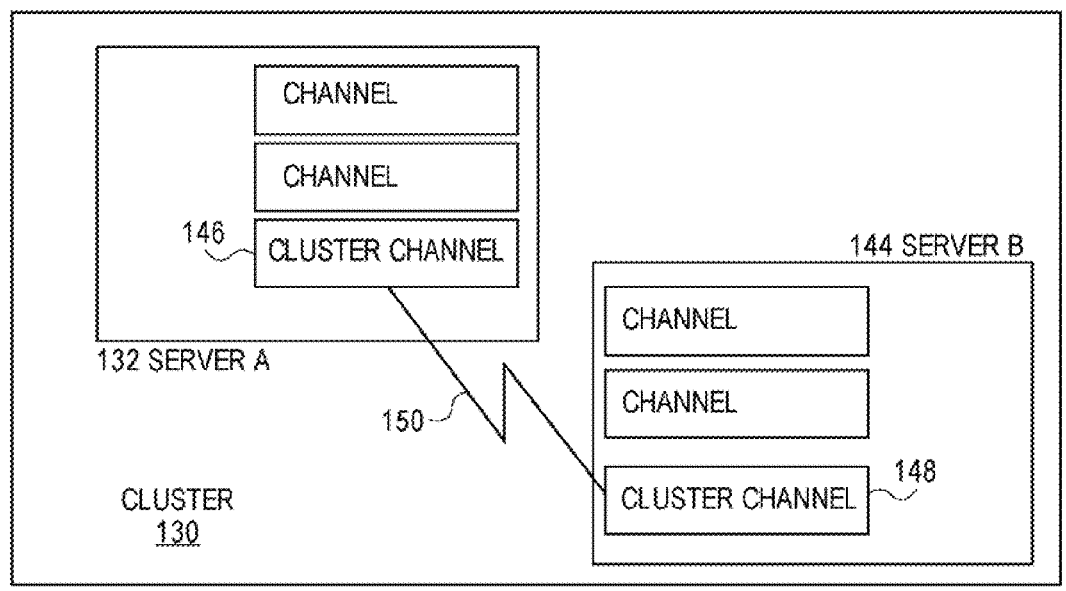
FIG. 2 shows an illustration of a cluster environment including channels in accordance with an embodiment of the invention.

FIG. 2 shows an illustration of a cluster environment including channels in accordance with an embodiment of the invention. As shown in FIG. 2, within a cluster 130, there may exist a number of servers 132, 144. Each server includes a number of dynamic channels as described above. A channel (cluster channel 146) may be designated as the channel used within the cluster for cluster-wide activities, for example servlet replication. The channel may then be configured to for example, replicate the servlets over a specific network card. This gives the administrator flexibility in optimizing the internal communications within the cluster.

Figure 3:
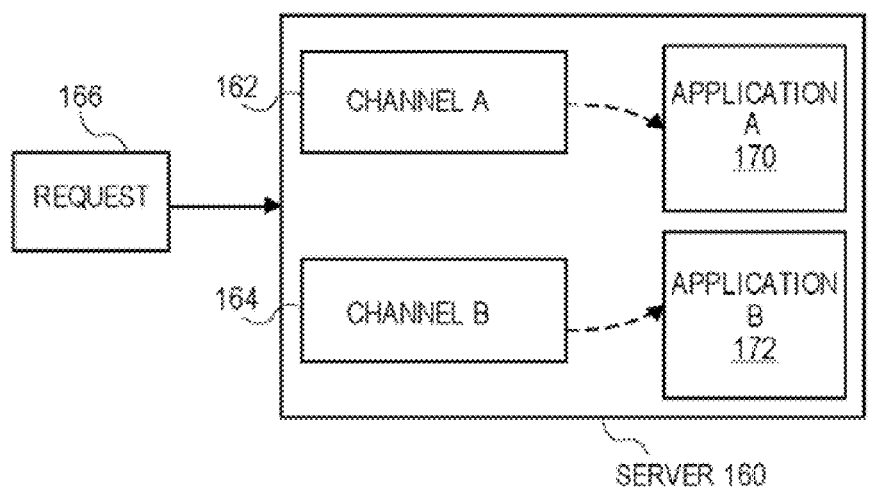
FIG. 3 shows an illustration of a multi-application channel configuration in accordance with an embodiment of the invention.

FIG. 3 shows an illustration of a multi-application channel configuration in accordance with an embodiment of the invention. As shown in FIG. 3, a channel may be application-scoped. In this way the system can restrict clients (or other entities) to accessing a particular application through a particular channel. In FIG. 3, a request or communication 166 is received at the server 160. Requests designated for application A 170 are handled by channel A 162. Requests designated for application B 172 are handled by channel B 164.

Figure 4:
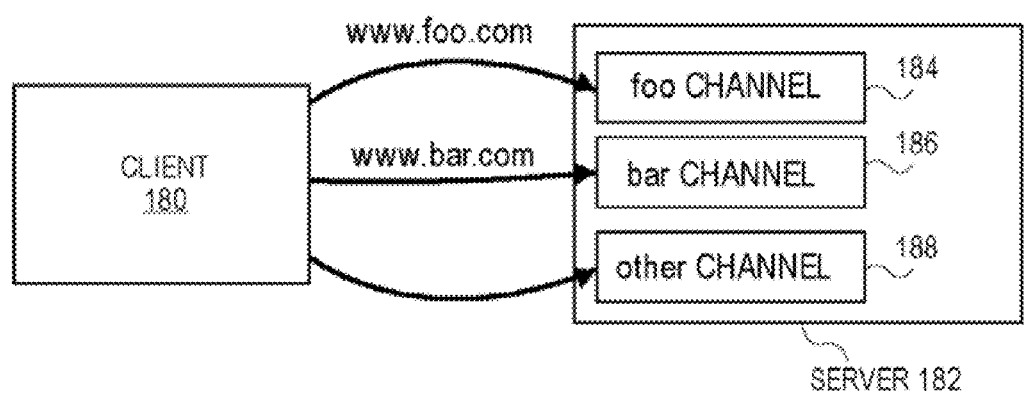
FIG. 4 shows an illustration of a channel-based virtual web site configuration in accordance with an embodiment of the invention.

FIG. 4 shows an illustration of a channel-based virtual web site configuration in accordance with an embodiment of the invention. As shown in FIG. 4, an administrator can associate a virtual web site with a particular channel. Requests for that virtual web site are received by the corresponding channel. For example, a client 180 may make requests at server 182 for website www.foo.com. The server may be configured to handle all of the http, JSP, etc. requests for this URL at the foo channel 184. Similarly, the server may be configured to handle all of the requests for the www.bar.com URL at the bar channel 186. A default channel 188 can be configured to handle other URLs.

Figure 5:
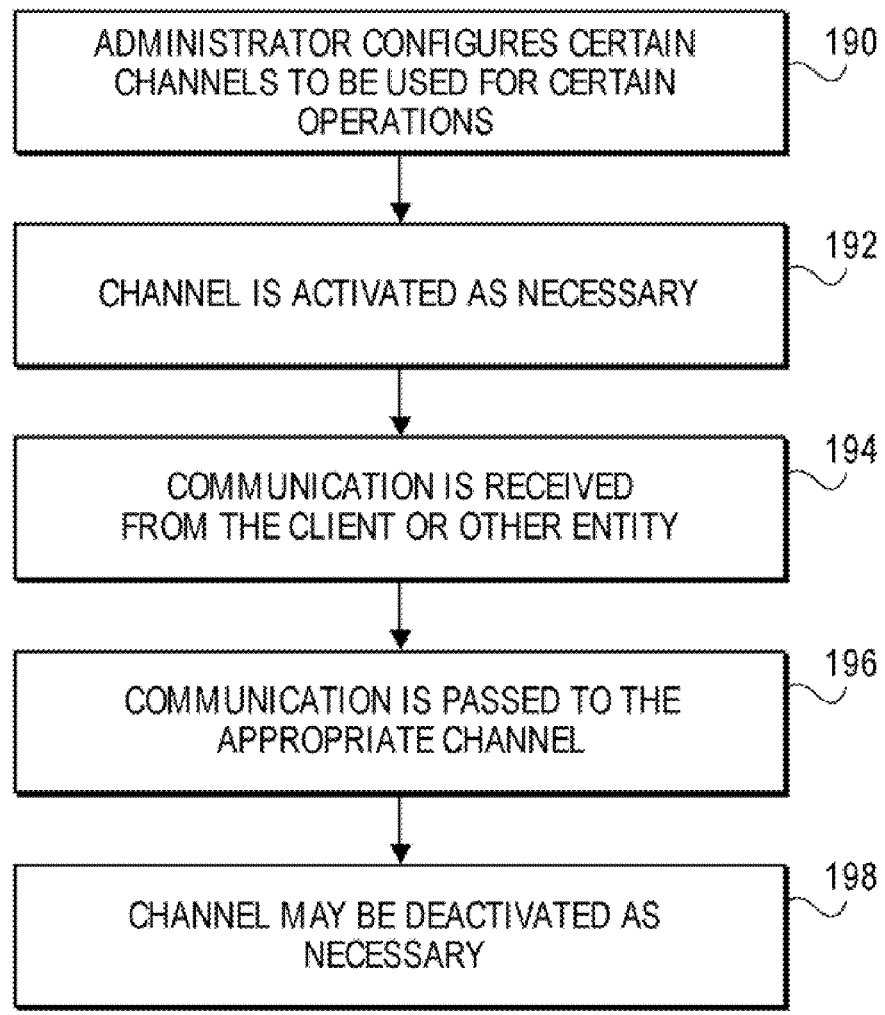
FIG. 5 shows a flowchart of a method for providing channels in accordance with an embodiment of the invention.

FIG. 5 shows a flowchart of a method for providing channels in accordance with an embodiment of the invention. As shown in FIG. 5, in step 190, and administrator configures certain channels to be used for certain operations, such as an application request, an intra-cluster communication, or a web-site access. In step 192, the channel is activated as necessary. In step 194, a communication is received from the client or other entity. In step 196, the communication is passed to the appropriate channel. In step 198, the channel may be deactivated as necessary.

In accordance with an embodiment, configuration of the SSL server identity is possible at the Channel level. Configuration of SSL one-way/two-way is also possible at the Channel level. Channels are configurable and startable at runtime. Multicast may be added as a channel property. It is possible to configure a named channel scoped against a specific application.

In accordance with an embodiment, it is possible to select specific channels for specific activities. All specific channels will default to the standard Channel, i.e. t3 with the server's default listen address and port. Multicast traffic can occur over (possibly many) multicast channels. It is possible to configure distinct Channels for the following server-to-server traffic: Admin bootstrap traffic; Session Replication; Administration (This will include DRS traffic and means any request that can change the configured state of the server); Internal (this will be the default fallback for everything); and Java Transaction API (JTA). It is possible to turn the default Channel off completely. If the default Channel is off, channel selection will be made semi-automatically. No load-balancing of Channel requests is carried out and Channels may not be used as a fault-tolerance mechanism, although at connect time the system will try available Channels until it succeeds or runs out of Channels.

Channel Monitoring

Currently channels have no specific monitoring capabilities, although comprehensive instrumentation can be added to all Channels and made available through JMX and the console.

Channel Lifecycle

In accordance with an embodiment, Channels have a defined lifecycle that obeys the standard Server Lifecycle requirements. It is possible to configure a channel without starting it, and stop a channel without deleting it (also known as "Suspend" and "Resume"), and without stopping the server.

Channel Configuration and Scoping

Channels will have several new configuration points:

Configuration of SSL server attributes is possible at the Channel level. This enables system administrators to give a WLS instance multiple "identities" from the perspective of a client application or browser. This enables better support for virtual hosts where web sites such as www.foo.com and www.bar.com can be hosted on the same server.

In accordance with an embodiment, Channels are configurable at runtime (but not gracefully shutdown at runtime). Since it is possible to scope Channels to an application and since applications can be deployed dynamically, it is desirable that Channels can be configured dynamically also. This means that an administrator can configure and start a new Channel without restarting the server. In some embodiments graceful shutdown of a Channel (including waiting for all in-flight work to finish) may also be performed. If time allows it is possible to abruptly terminate a Channel.

All properties of a Channel are dynamically configurable. Many properties of a Channel relate directly to features of the underlying ServerSocket and where these cannot be physically changed dynamically they are configurable by restarting the Channel.

Multicast can be added as a channel property. If a Channel is specified as multicast enabled, the server will use that channel for sending and receiving multicast messages.

It is possible to configure a named channel scoped against a specific application. This guarantees exclusive access to an application over a particular Channel. Every Channel has a name, and if an application was configured with that channel name specified, then only requests over that Channel would be serviced by the application.

It is possible to configure a multiplexer (muxer) for a particular channel and associated muxer properties.

SSL Configuration

In accordance with an embodiment, configuration of SSL server attributes is possible at the Channel level. This will mean that the following SSLMBean values will now be present on the NetworkAccessPointMBean also:

SSL.ClientCertificateEnforced

SSL.TwoWaySSLEnabled

SSL.ServerPrivateKeyAlias

SSL.PrivateKeyPassPhrase.

These new attributes are reflected in the Channel console pages, however for simplicity no checking of the specified certificate is enforced since the admin server may not actually have access to the referenced keystore. The format of the extra attributes must be the same as those that already exist for the SSL configuration console pages.

Dynamic Configuration

In accordance with an embodiment, it is possible to configure a channel in the console or through for example, weblogic.Admin, and then "start" that Channel without rebooting the server. "Starting" a Channel means that it starts listening on the configured IP-address and port for the configured protocol. It is possible to shutdown the dynamically configured channel, but shutdown will not make any attempt to gracefully terminate in-flight work—the ServerSocket will simply be closed. Stopping a Channel is distinct from deleting a channel. A stopped Channel can be restarted. Stopping and restarting a channel will provide a way to reconfigure some properties at runtime which can only be changed through the re-creation of a ServerSocket.

Multicast Channel

In accordance with an embodiment, it is possible to select a configured channel as the multicast address and port for cluster communication. This is selectable in the console from the list of existing channels. It will not be possible to select SSL channels for multicast or address/port combinations that are already used by SSL enabled Channels. Properties specific to multicast will still be a separate configuration point.

Application Scoping

In accordance with an embodiment, it is possible to configure an application to use a named channel. For instance in the deployment descriptor for the application it would have something akin to:

<application-channel-reference> MyCustomChannel</application-channel-refence>

The deployed app would only then be reachable via that custom channel. Channels would not be deployed as part of the application, but merely referenced by the deployed application. An application deployed with a named-channel would be the application selected by default when accessing the URL for that channel. If two channels are deployed with the same named channel then an error is given, unless the applications have been deployed with non-overlapping context paths. If an application is deployed with a named channel then it must not be possible to access that application from any other channel. The channel would have to be started for successful deployment of the application in this way. If the specified channel was missing then the application reverts to using the default channel with a warning in the log. JNDI names introduced by the application will still be visible from other channels.

Muxer-Per-Channel

In accordance with an embodiment, it is possible to configure a muxer for a particular channel and associated muxer properties. This will enable customers to use a different muxer (e.g. NIO) in a server and change the following properties:

Reader threads-per-muxer. This prevents reader-thread starvation on the default muxer.

Enable direct-dispatch for a particular channel. This is useful for fast dispatch of heavy inter-server traffic such as replication.

Discriminate only on registered protocols. This reduces the overhead associated with discrimination.

Channelization of Internal Traffic

In accordance with an embodiment, customers can currently configure channels to be used for external traffic and then use the default channel for all internal traffic. This allows them to separate application traffic from internal traffic preventing administration problems that would occur if the internal traffic was slowed down by a deluge of application traffic. However, customers often have additional needs for internal traffic:

They require internal administration traffic to occur over a secure connection, but they do not want to bear the cost of security overhead for other items. Customers' definitions of what needs to be secure vary, some require simply administration traffic, others include traffic with potentially-sensitive application data such as session replication.

They require a way of monitoring data/message volumes for particular kinds of traffic, especially where those volumes could be large—session replication traffic for instance. This also applies to field personnel trying to diagnose problems with live systems.

Channel Selection

In accordance with an embodiment, it is possible to select specific Channels for specific activities. All specific channels will default to the standard Channel, i.e. t3 with the server's default listen address and port. In the absence of a named Channel, or a default Channel supporting the required protocol, Channel selection is made in a round-robin fashion from available Channels supporting the required protocol. In order to support named Channels it is necessary for a server to know the various remote connection possibilities in another server. This is true within a cluster, or where JVMIDs have been exchanged during bootstrap. In this instance the name of a remote Channel can be used to determine connectivity since all of the remote Channels—and corresponding listen addresses—is known. Bootstrap, therefore, is problematic. A number of schemes can be envisaged to overcome this:

Allow bootstrap to a well known address, but redirect to another once JVMIDs have been exchanged.

Publish JVMIDs through a JVMID-service. This would allow inter-domain exchanges to know full remote JVMID information.

Do nothing and only use named channels for intra-cluster communication. This is possibly all that is required since segregation of Channel traffic is only likely to be required within a cluster. Site-failover and replication makes this solution more problematic.

Internal Channels

In accordance with an embodiment, all internal traffic can be configured to happen over a particular Channel. In the absence of configuration this Channel is the default Channel. However, it is possible, via configuration, to remove all dependencies on the default Channel, allowing customers to route all internal traffic over custom Channels. The only possible exception to this is automated remote Channel discovery (which would require a well known bootstrap Channel)—which is currently out of plan. It is possible to configure distinct Channels for the following server-to-server traffic within a cluster: Multicast traffic; Replication traffic; JTA; Administration (this will include DRS traffic); and Internal. This is the default fallback for everything and is based on the default protocol, i.e. if t3 is configured as the default protocol then the RMI channel with t3 is used. If the RMI channel only supports one protocol then that protocol is used by default. This assumes that local and remote ends both support the same protocol as default. Outside of a cluster only administration traffic is channelizable. Internal traffic can be channelized for the purposes of security and monitoring.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as is apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing channels within application servers, comprising:
    a server, including one or more processors;
    a plurality of applications provided on the server for access by clients when servicing requests;
    a plurality of channels for use by the clients in accessing the plurality of applications, wherein each of the plurality of applications include virtual websites each having a unique address and a channel associated therewith for receiving requests for each virtual website, and wherein the plurality of channels operating within a plurality of servers include a cluster channel;
    a configuration file that includes a list of the plurality of applications, including for each application in the list a channel provided by the server that is used to access said application; and
    wherein at run time the server
        parses the configuration file,
        defines, according to the configuration file, an association between the plurality of channels with the plurality of applications, and whereupon receiving a request the server,
            determines, in the request, which application the request is directed to,
            assigns the request to the channel as specified by the configuration file, wherein when the request received is to access one of the plurality of applications on another server, the cluster channel is assigned for use in accessing the application, and
            transmits the request to the application via the assigned channel.

2. The system of claim 1 wherein the configured channel is used to access to the application.

3. The system of claim 1 wherein the channel may be activated or suspended by an administrator.

4. The system of claim 3 wherein the activation or suspension happens dynamically without necessitating the restart of the server.

5. The system of claim 1 wherein the system includes a plurality of servers operating within a cluster, and wherein a channel is configured at each server for intra-cluster communications.

6. A method for providing channels within application servers, comprising the steps of:
    providing a server, including one or more processors;
    providing a plurality of applications provided on the server for access by clients when servicing requests;
    providing a plurality of channels for use by the clients in accessing the plurality of applications, wherein each of the plurality of applications include virtual websites each having a unique address and a channel associated therewith for receiving requests for each virtual website, and wherein the plurality of channels operating within a plurality of servers include a cluster channel;
    providing a configuration file that includes a list of the plurality of applications, including for each application in the list a channel provided by the server that is used to access said application; and
    wherein at run time the server
        parses the configuration file,
        defines, according to the parsed configuration file, an association between the plurality of channels with the plurality of applications, and whereupon receiving a request the server,
            determines, in the request, which application the request is directed to,
            assigns the request to the channel as specified by the configuration file, wherein when the request received is to access one of the plurality of applications on another server, the cluster channel is assigned for use in accessing the application, and
            transmits the request to the application via the assigned channel.

7. The method of claim 6 wherein the configured channel is used to access to the application.

8. The method of claim 6 wherein the channel may be activated or suspended by an administrator.

9. The method of claim 8 wherein the activation or suspension happens dynamically without necessitating the restart of the saner.

10. The method of claim 6 wherein the system includes a plurality of servers operating within a cluster, and wherein a channel is configured at each server for intra-c luster communications.

11. The system of claim 1 wherein communications include Multicast communications, replication communications, Java Transaction API (JTA) communications, and administration communications.

12. The method of claim 6 wherein communications include Multicast communications, replication communications, Java Transaction API (JTA) communications, and administration communications.

13. A computer readable medium, including instructions stored thereon which when executed cause the computer to perform the steps of:
    providing a server, including one or more processors;
    providing a plurality of applications provided on the server for access by clients when servicing requests;
    providing a plurality of channels for use by the clients in accessing the plurality of applications, wherein each of the plurality of applications include virtual websites each having a unique address and a channel associated therewith for receiving requests for each virtual website, and wherein the plurality of channels operating within a plurality of servers include a cluster channel;

providing a configuration file that includes a list of the plurality of applications, including for each application in the list a channel provided by the server that is used to access said application; and wherein at run time the server parses the configuration file, defines, according to the configuration file, an association between the plurality of channels with the plurality of applications, and whereupon receiving a request the server, determines, in the request, which application the request is directed to, assigns the request to the channel as specified by the configuration file, wherein when the request received is to access one of the plurality of applications on another server, the cluster channel is assigned for use in accessing the application, and transmits the request to the application via the assigned channel.

14. The computer readable medium of claim 13, wherein access to the application is only possible via the configured channel.

15. The computer readable medium of claim 13, wherein the channel may be activated or suspended by an administrator.

16. The computer readable medium of claim 15, wherein the activation or suspension happens dynamically without necessitating the restart of the server.

17. The computer readable medium of claim 13, including a plurality of servers operating within a cluster, and wherein a channel is configured at each server for intra-cluster communications.

18. The computer readable medium of claim 13, wherein communications include Multicast communications, replication communications, Java Transaction API (JTA) communications, and administration communications.

19. The system of claim 1, wherein each channel has a name, and wherein requests by an application configured with the name of the channel will be sent via the named channel.

20. The method of claim 1, wherein each channel has a name, and wherein requests by an application configured with the name of the channel will be sent via the named channel.

* * * * *

UNITED STATES PATENT AND TRADEMARK OFFICE
CERTIFICATE OF CORRECTION

| | | |
|---|---|---|
| PATENT NO. | : 7,649,854 B2 | Page 1 of 1 |
| APPLICATION NO. | : 11/130252 | |
| DATED | : January 19, 2010 | |
| INVENTOR(S) | : Andrew Piper | |

It is certified that error appears in the above-identified patent and that said Letters Patent is hereby corrected as shown below:

In column 5, line 36, delete "refence" and insert -- reference --, therefor.

In column 8, line 47, in claim 9, delete "saner." and insert -- server. --, therefor.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,649,854 B2
APPLICATION NO. : 11/130252
DATED : January 19, 2010
INVENTOR(S) : Andrew Piper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this

Twenty-third Day of November, 2010

David J. Kappos
*Director of the United States Patent and Trademark Office*